Patented Apr. 13, 1954

2,674,791

UNITED STATES PATENT OFFICE 2,674,791

METHOD OF SOLDERING ALUMINOUS METAL PARTS BY TREATING WITH BROMIDE AND IODIDE FLUXES

Alden P. Edson, Hartford, and Isaac L. Newell, Wethersfield, Conn., assignors to United Aircraft Corporation, East Hartford, Conn., a corporation of Delaware No Drawing. Application April 15, 1950, Serial No. 156,232

7 Claims. (Cl. 29—368)

The present invention relates to the joining of metal parts by means of solder, and more particularly to the vapor fluxing of the metals to be joined.

Objects and advantages of the invention will be set forth in part hereinafter and in part will be obvious herefrom, or may be learned by practice with the invention, the same being realized and attained by means of the processes and compositions pointed out in the appended claims.

The invention consists in the novel processes and compositions herein shown and described.

The art of joining metals together by such operations as brazing, welding, soldering and the like has heretofore generally employed as fluxes compounds which leave residues after the joining operation. These fluxes are often difficult to remove from the metals either due to lack of complete solubility in the solvent employed or due to the geometry of the assembly. They are usually highly corrosive in the presence of moisture and often eventually lead to premature failure of the metal or the bond and may interfere with the function or appearance of the parts joined. They may also interfere with paint adhesion, electroplating and other methods of finishing or protecting the surface of metals.

The normal requirement of a flux for soldering is that it shall remove metal oxides from the surfaces of the solder and the parts being joined, without significant detrimental effect on the metals themselves. Removal of the metal oxides can be effected by vapor-fluxing by means of a gaseous or volatile compound or mixture containing a reducing agent capable of reacting with the oxygen of the metal oxides so as to form a new oxide dispersed under the conditions of bonding, together with an agent capable of reaction with the metal formerly combined as metal oxide so as to produce a new metal compound dispersed under the conditions of bonding. In order to render the vapor-fluxing process effective, it is necessary that certain additional criteria obtain.

The first criterion for a gaseous flux is that the fluxing material shall be stably gaseous; that is, that it shall not spontaneously react internally or with the metals of the system so as to produce a liquid or solid phase under bonding conditions. This condition is assured in systems wherein the total thermodynamic free energy of the system would be increased by such a reaction or transformation.

The second criterion for a gaseous flux is, obviously, that the fluxing reaction must occur. This condition is met by those systems in which the total thermodynamic free energy of the system under bonding conditions is reduced by reaction of the gaseous atmosphere with all of the metal oxides of the system so as to provide dispersed new oxides and metal compounds.

The third criterion for a gaseous flux is that the new dispersed oxide or oxides shall not react with any component of the system so as to create an undispersed phase under bonding conditions. For instance, in a system containing a substantial quanity of iron oxide and zinc, hydrogen will react with the oxygen of the iron oxide to produce dispersed water vapor which will again react with the zinc so as to produce undispersed zinc oxide. This criterion is met by systems in which the total thermodynamic free energy of the system would be increased by any reaction by which the dispersed new oxide could be converted to an undispersed phase.

The fourth criterion for a gaseous flux is that the dispersed new metal compound or compounds formed by the fluxing reaction shall not react with any component of the system so as to create an undispersed phase under bonding conditions. This criterion is met by systems in which the total thermodynamic free energy of the system would be increased by any such reaction.

The fifth criterion for a gaseous flux is that the gas shall not react to a harmful extent with the elemental metals of the system under bonding conditions. This condition is met by systems in which the total thermodynamic free energy of the system is not significantly decreased by such a reaction, and the desirable condition of no such reaction is provided by the systems in which the free energy would be increased by it. A representative violation of the latter condition is encountered in the treatment of cadmium with hydrogen chloride at elevated temperature, resulting in the formation of cadmium chloride and hydrogen.

Technically, the dispersion of the products of the fluxing reaction is possible in three ways: as solid particles distributed in the metals of the system, as fused compounds dispelled from the bond area by the action of presure or through the wetting action of the molten solder, or as gases dispersed in the atmosphere of the system and capable of removal with it. The latter represents the ideal condition, and is provided by the volatile inorganic bromides and iodides for which tests are reported here.

It has heretofore been proposed to flux the parts to be brazed, welded or soldered by means of various fluorine containing compounds, but the use of such fluorine compositions requires special expensive equipment and the fluorine compounds themselves are relatively expensive and dangerous to handle, thereby limiting to a considerable extent the application of the fluorine compounds to a large field of brazing and soldering operations.

The present invention provides a novel and improved process wherein the materials used are unobjectionable with respect to the etching or corrosion of the parts being joined, and no residual flux is left on the parts after the brazing or soldering operation has been completed, while the fluxing operation is efficiently carried out at from about 450° F. to about 900° F. so that the metal parts are joined with a high strength bond. A further object of the invention is to provide a process of vapor fluxing of the parts to be joined by soldering or welding which process employs compounds which may be handled with much less elaborate and expensive apparatus than the gaseous fluorine containing compounds, are easily recovered or disposed of, and at the same time produce excellent bonds between the metals being joined.

Volatile inorganic bromides and iodides which are completely a bromide or iodide and which form relatively stable oxides and are either gaseous or have substantial volatility at the temperature of brazing, give good fluxing action when incorporated into a stable nonoxidizing atmosphere used in the brazing operation, and these volatile inorganic bromides and iodides may be compounds which are liquid, gaseous or solid at normal temperatures and pressures.

The volatile inorganic bromide and iodide vapors have a relatively high specific gravity, at least 2.8 times heavier than air and are particularly suitable for incorporation into a stable gaseous nonoxiding atmosphere for use as a flux. This atmosphere may be stationary or a continuous flow of the flux containing atmosphere may be maintained through or past the parts being fluxed and brazed. Such volatile inorganic bromides and iodides may contain nitrogen in which case the nitrogen is present in pentavalent form with the bromide or iodide bonded to the nitrogen in the molecule.

By "stable nonoxidizing atmosphere" is meant a gas without detrimental action on the metals employed. For example, if the materials used are straight carbon steel, then an atmosphere of pure dry nitrogen would be suitable as a carrier for the volatile inorganic bromide or iodide, while if the metal used would react with nitrogen, then an atmosphere of pure dry helium would be satisfactory as the carrier gas. In the case of volatile inorganic bromides or iodides which are completely gaseous at the temperature of brazing (450° F. to 900° F.), the stable nonoxidizing atmosphere may consist wholly of the volatile inorganic bromide or iodide.

By "stably gaseous" is meant a compound which does not decompose at the temperatures in question to yield products which are nongaseous at those temperatures.

As used herein, the terms "volatile inorganic bromides" and "volatile inorganic iodides" mean those bromides and iodides which are either gaseous or have substantial volatility at the temperature of brazing, are substantially inert with respect to the metals to be joined and to the metal used as a solder, which are either completely a bromide or an iodide and contain no carbon, and which are "stably gaseous." Thus, organic bromides such as carbon tetrabromide and ethyl iodide are excluded, as they contain carbon and are therefore not inorganic; sulfur dibromide is excluded as it is not inert with respect to the metals to be joined; nitrogen triiodide is excluded as it could not exist as an iodide at the temperature of brazing; and cuprous iodide is excluded as it would not be gaseous or substantially volatile at the temperature of brazing.

Excellent joints can be obtained between metal parts using the process of the present invention with a variety of alloys, for example with mild steel, malleable iron, 18-8 stainless steel, 12% chromium stainless steel, copper, brass, bronze, phosphor bronz, aluminum and aluminum alloys, titanium and zirconium alloys, gold alloys, and platinum, osmium, iridium and palladium particularly where these metals are to be joined to other metals.

Among the volatile inorganic bromides and iodides which may be used in carrying out the present invention, the following are exemplary of those which are particularly useful: boron tribromide, titanium tetrabromide, titanium tetraiodide, aluminum bromide, aluminum iodide, phosphorus tribromide, ammonium bromide, ammonium iodide, hydrazine hydrobromide, hydrazine hydroiodide and hydroxyl ammonium bromide and hydroxyl ammonium iodide.

Various other volatile inorganic bromides and iodides which are completely bromides or iodides are useful in fluxing particular metals or alloys, but are not as widely useful as the enumerated compounds, most of which are of general application, although in the selection of a particular volatile inorganic bromide or iodide to be used for fluxing a particular metal, attention would, of course, be given to avoidance of the formation of undesirable metallic compounds. For instance in general it would be desirable to avoid the use of phosphorous tribromide where iron or steel parts were to be joined, although phosphorous tribromide would be entirely suitable for use in the fluxing and soldering of copper alloys.

The volatile inorganic bromides and iodides which are completely bromides or iodides and are useful in the process of the present invention, avoid the inclusion of carbon, inasmuch as the presence of any carbon in the volatile bromide or iodide would give rise to the formation of soot particularly if the fluxing operation is carried out at temperatures up to about 900° F., and even some difficulty would be experienced with the use of such carbon containing bromides or iodides at temperatures as low as 450° F.

The strength of the soldered parts produced in practicing the present invention is at least as high as as that of the soldered parts formed by the methods heretofore used and no residue remains in the parts formed by this process when the parts are free from dirt and oxides prior to joining. In parts contaminated with oxides prior to joining, any residue from the fluxing action is slight and proportional to the oxides originally present.

In carrying out the process the parts to be soldered with the solder in place at the joint may be enclosed in a muffle and the atmosphere within the muffle may be purged with a stable nonoxidizing gas such as pure dry nitrogen or pure dry helium and after the purging is complete and the parts have been heated, the volatile inorganic bromide or iodide fluxing agent may be introduced into the muffle just prior to the time when the temperature of the parts to be joined is raised to the soldering temperature. Where rapid fluxing is desired, the entire stable non-oxidizing atmosphere may be completely replaced by vapor or gas consisting of the volatile inorganic bromide or iodide, and even more rapid fluxing action may be obtained by flowing the gaseous inorganic bromide or iodide through the muffle during the fluxing and soldering operations.

Where rapid fluxing is not of importance, a small quantity of the gaseous or vaporized volatile inorganic bromide or iodide may be introduced into the stable nonoxidizing atmosphere, and the parts to be joined are allowed to remain in that atmosphere at the elevated temperature for as long a period as is necessary to completely flux the parts.

The time required for the fluxing, and the concentration of the fluxing agent will depend largely upon the condition of the surfaces to be joined, and on those surfaces which have a considerable amount of oxide contaminant, the treatment should be at a higher concentration of the fluxing agent, for a longer period of time or with a dynamic flow of the volatile inorganic bromide or iodide or some combination of these three factors, the amount of volatile inorganic bromide or iodide supplied to the parts to be fluxed also being in excess of the stoichiometrical requirements of the oxide contaminant.

Thus in many instances and where the joints are relatively free from oxides, a mere fraction of 1% of the volatile inorganic bromide or iodide in the nonoxidizing atmosphere being flowed past or through the parts to be joined will be sufficient, particularly where the flowing of the fluxing gas is maintained for a considerable period of time, while with joints where the contamination is relatively great, it may be desirable to treat the joints with an atmosphere which consists entirely of the gaseous or vaporized volatile inorganic bromide or iodide.

Moderately high temperatures are required for effective fluxing in accordance with the present invention, and in all instances the parts to be joined will be heated at temperatures of at least about 450° F. during the fluxing and soldering operations. The higher the temperature the more rapid is the fluxing action, and where the metals and solder are suited to higher temperature operation, temperatures as high as about 900° F. may be employed.

The unused bromide or iodide, particularly where a dynamic flow of the flux containing atmosphere is maintained through or around the parts being joined are easily recovered by absorption or condensation.

As previously stated, the volatile inorganic bromide or iodide in its gaseous or vapor form is at least 2.8 times heavier than air, and is preferably at least four or more times heavier than air. Hydrogen bromide, while useful, is thus less desirable than boron tribromide which has about eight times the specific gravity of air. The gaseous or vaporized bromides or iodides, particularly the heavier vapor, can all be used in a vented system where the muffle or hollow part being brazed is formed with an upper vent hole.

*Example No. 1*

In joining interior copper surfaces, such as pipes in the interior of a tank, the parts to be joined are held in position mechanically with lead-tin foil placed between them. Boron tribromide, ammonium iodide or aluminum bromide is then put in the interior of the tank in sufficient quantity to produce at least five volumes of vapor at the temperature to be used in joining. The tank is then closed with the exception of an uppermost venthole and is heated by suitable means, such as furnace or salt bath. After the time required for the metal and brazing alloy to come to brazing temperature, the heat is removed and the tank allowed to come to room temperature. While cooling, the tank is purged with nitrogen or other nonoxidizing gas to remove the flux while in the vapor phase. No washing or cleaning action is required after the brazing operation.

*Example No. 2*

In the manufacture of bimetal strips in which a copper alloy strip is soldered to a steel member, assemblies of the steel member, solder and alloy strip copper are placed in a heated muffle which is sealed. The air is purged from the muffle by means of an inert atmosphere, and gaseous hydrogen bromide is admitted to the muffle. The temperature is raised to 500° F. and the joining of the metals takes place. The muffle is allowed to cool, and, when the temperature is below the solidification point of the solder, the muffle is again purged with an inert gas. The muffle is then allowed to cool to room temperature and the assemblies removed. No cleaning will be necessary on these parts.

It is to be understood that the present invention is not confined to the fluxes and metals mentioned in the foregoing specification, assemblies but that the volatile inorganic bromides and iodides which react to form oxides having a lower free energy than water, may be used for the fluxing of various metals to be soldered. Certain of the fluxes, of course, are more desirable and give better results with certain metals than other fluxes with those metals, and the best results will always be obtained by properly selecting the flux for the metals to be used in soldering. Thus for the ferrous, copper and precious alloys almost any of the volatile inorganic bromides and iodides are satisfactory, and with ferrous alloys boron tribromide, ammonium iodide, aluminum bromide and tungsten pentabromide are particularly desirable; with the copper alloys hydrazine hydrobromide and hydrazinium hydrobromide or hydroiodide as well as phosphorous tribromide give very satisfactory joints. As other examples, aluminum and its alloys may be satisfactorily fluxed using titanium tetrabromide, the nickel chromium alloys may be fluxed by using zirconium tetrabromide or most of the other volatile inorganic bromides or iodides. Zirconium and its alloys may be satisfactorily fluxed using hydroxylammonium iodide or ammonium iodide.

Ammonium bromide or iodide, hydrazine hydrobromide or hydroiodide, hydroxylammonium bromide or iodide and hydrazinium hydrobromide or hydroiodide are useful, are much more easily handled and with better results than are obtainable with hydrogen chloride.

In general the volatile inorganic bromides and iodides of radicles which form stable oxides and are heavier than air produce soldered joints of equal strength and with as little corrosion as the joints produced by fluxing with vaporized or gaseous fluorine containing compounds, and yet present numerous advantages over the use of such fluorine containing compounds. In general the bromides and iodides are more easily reduced than the fluorides and the fluxing can be carried out at a much lower temperature than with the fluorides. The bromides and iodides have higher specific gravity than the fluorides and are thus more adaptable to use in systems where the gases are exhausted through an upper vent at atmospheric pressure.

The invention in its broader aspects is not limited to the specific processes and compositions shown and described but departures may be made therefrom within the scope of the accompanying claims without departing from the principles of the invention and without sacrificing its chief advantages.

What is claimed is:

1. The process of joining metal parts selected from the group consisting of aluminum and aluminum-containing alloys by solder which includes fluxing the metal parts and solder at soldering temperature by means of a stable gaseous atmosphere substantially inert with respect to the metals being treated but reactive with their oxides, the active component of which atmosphere is provided by a compound selected from the group consisting of the volatile inorganic bromides and iodides having two or more atoms selected from the group consisting of bromine and iodine atoms connected to a single atom and having a molecular weight at least 250 reactive with the oxide of the metals, said compound being volatile at soldering temperatures and subjecting the metal parts to said stable gaseous atmosphere at soldering temperature until the metal parts have been bonded by said solder.

2. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated, the active component of which atmosphere is provided by a compound selected from the group consisting of the volatile inorganic bromides and iodides having two or more atoms selected from the group consisting of bromine and iodine atoms connected to a single atom and having a molecular weight at least 250 reactive with the oxides of the metals, which compound is volatile below the soldering temperature, and subjecting the metal parts to said stable gaseous atmosphere at soldering temperature until the metal parts have been bonded by said solder and purging the solder and metals of said compound.

3. The process of joining metal parts selected from the group consisting of aluminum and aluminum-containing alloys by solder which includes fluxing the metal parts at soldering temperature by means of a stable gaseous atmosphere inert with respect to the metals being treated, which atmosphere consists of a compound selected from the group consisting of the volatile inorganic bromides and iodides having two or more atoms selected from the group consisting of bromine and iodine atoms connected to a single atom and having a molecular weight at least 250 which are completely gaseous below the soldering temperature and subjecting the metal parts to said stable gaseous atmosphere at soldering temperature until the metal parts have been bonded by said solder.

4. The process of joining metal parts selected from the group consisting of aluminum and aluminum-containing alloys by solder which includes fluxing the metal parts at soldering temperatures by means of a stable gaseous atmosphere inert with respect to the metals being treated, which atmosphere consists of an inert gas and a compound selected from the group consisting of the volatile inorganic bromides and iodides having two or more atoms selected from the group consisting of bromine and iodine atoms connected to a single atom and having a molecular weight at least 250 which are non-gaseous at normal temperatures and pressures and are volatile below the soldering temperature, and subjecting the metal parts to said stable gaseous atmosphere at soldering temperature until the metal parts have been bonded by said solder and purging the solder and metals of said compound with a stable inert gas before solidification of said solder.

5. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated and consisting of a compound selected from the group consisting of the volatile inorganic bromides and iodides having two or more atoms selected from the group consisting of bromine and iodine atoms connected to a single atom and having a molecular weight at least 250, reactive with the oxides of the metals, which compound is non-gaseous at normal temperatures and pressures and which is completely gaseous at the soldering temperature and pressure and subjecting the metal parts to said stable gaseous atmosphere at soldering temperature until the metal parts have been bonded by said solder.

6. The process of joining metal parts selected from the group consisting of aluminum and aluminum-containing allows by solder which in gaseous atmosphere, substantially inert at soldering temperature by means of a stable gaseous atmosphere, substantially inert at soldering temperature with respect to the metals being treated, the only active component of which atmosphere is provided by a compound selected from the group consisting of the volatile inorganic bromides and iodides having two or more atoms selected from the group consisting of bromine and iodine atoms connected to a single atom and having a molecular weight at least 250 reactive with the oxides of the metals, which compound is non-gaseous at normal temperatures and pressures and is volatile below the soldering temperature and subjecting the metal parts to said stable gaseous atmosphere at soldering temperature until the metal parts have been bonded by said solder.

7. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated, the active component of which atmosphere is provided by boron bromide and subjecting the metal parts to said stable gaseous atmosphere at soldering temperature until the metal parts have been bonded by said solder.

(References on following page)

References Cited in the file of this patent

UNITED STATES PATENTS

| Number | Name | Date |
|---|---|---|
| 946,164 | Schoop | Dec. 14, 1909 |
| 1,536,944 | Steenstrup | May 5, 1925 |
| 2,561,566 | Edson et al. | July 24, 1951 |
| 2,585,819 | Moore et al. | Feb. 12, 1952 |

FOREIGN PATENTS

| Number | Country | Date |
|---|---|---|
| 677,994 | Germany | July 6, 1939 |

OTHER REFERENCES

Amer. Mach., Controlled Heat-Treating Atmospheres, Nov. 12, 1942, pp. 1315 and 1317.